Patented Aug. 22, 1939

2,170,271

UNITED STATES PATENT OFFICE 2,170,271

STARCH COMPOSITION AND PROCESS

James F. Walsh, Chicago, Ill., and Willard L. Morgan, Cranston, R. I., assignors to American Maize-Products Company, a corporation of Maine No Drawing. Application March 5, 1938, Serial No. 194,172

8 Claims. (Cl. 127—33)

Our invention relates to starch compositions and more particularly to starch compositions in which chemical thinning agents are used to reduce the viscosity of the starch when made into a paste, thereby permitting a greater starch solids content in the paste at a desired consistency.

As is well known to those skilled in this art two of the largest uses of starch are, as a textile sizing and as a base for paper coating. In both of these uses it is desirable to apply the largest amount of starch possible on the fibrous materials in one treatment. Also, in the filling and coating of paper with starch it is highly desirable that the starch solution have a minimum water content since this water must be removed subsequently by drying the coated or impregnated paper stock. If the starch is of such a nature as to require large quantities of water the expense of the processing is increased and the treated material is subject to wrinkling during the prolonged or intense drying treatment. It is therefore desirable that coating and impregnating starch solutions should have a maximum starch solids content and a minimum water content. This optimum type of product however is limited by the viscosity of the starch paste, which must be sufficiently thin to be easily applied and flow smoothly on the coated material.

The common type of starch without any modifying treatment gives very thick suspensions when heated with hot water in the proportions of as little as one part of starch to 17 parts of water. This is considered in the industry as a low solids content, but without modification of the starch this proportion cannot be exceeded and the starch still remains sufficiently fluid for the treatment of textiles and paper. In view of this limitation various attempts have been made to so treat or modify the common starch that its consistency when pasted with hot water in the above named or greater proportions of starch will be diminished; the primary purpose being to use as much starch as possible and as little water as possible. The treatments of starch heretofore as possible. The treatments of starch heretofore proposed for this purpose produce generally the products known as thin boiling starches, roasted starches, or dextrins, oxidized starches and starches treated with enzymes. These are examples of modified starches as referred to in this specification and in the claims herein. Other similar modified forms of starches resulting from treatment with acids or alkalis are also contemplated. The thin boiling starches are generally produced by treating a common starch with acid. The cost of manufacture of these thin boiling starches is relatively high and their commercial use has therefore been limited. The roasted starches or dextrins, although permitting a rather high solids content in the starch solutions have been limited in use because of their tendency to stickiness and also because of the poor strength of the films produced from these starches.

At the present time the most satisfactory modified starches for paper and textile use are those which have been slightly modified by treatment with certain oxidizing agents, particularly hypochlorites. These starches technically are satisfactory for use in paper but in their preparation a considerable amount of starch is lost as cold water soluble products. Furthermore, relatively large amounts of the oxidizing agent are required for preparation of the starches so that these starches are considerably more expensive than the ordinary common starch. The enzyme treated starches produce a starch paste suspension of high solids content and yet sufficiently thin to be used in the paper industry, but the treatment of these starches with enzymes so increases their cost that commercial use of the same is restricted.

In view of the substantial difference in cost between common starch and the specially treated starches described above there has been a desire in the starch industry for a common starch product which would permit the use of a high solids content in the starch paste suspensions and would automatically thin itself sufficiently when made into a paste that the latter could be easily and effectively used in the paper and textile trades.

An object of our invention is to provide a starch composition which will permit a maximum solids content in paste made therefrom with a minimum amount of water.

We have discovered in accordance with our invention that ordinary common starch in unmodified form may be made to fulfill advantageously all of the requirements of the paper and textile industries if the starch is admixed with certain solid acid salts of amides or of amino acids. For purposes of classification the amino acid salts are disclosed and claimed in our copending application Serial No. 194,173, filed March 5, 1938, the salts of amides being covered in this application.

The acid salts of amides may be mixed with the starch in dry form to provide a composition which when mixed with water and heated to form a paste will automatically cause a rapid thinning action such that a starch paste of maximum starch solids content with a minimum amount of water may be obtained. These pastes may then be used in the conventional manner for impregnating and coating textiles, paper and other materials. Generally the acid salts that may be mixed with the starch to accomplish this desired purpose are solid acid salts of amides containing the radical $CO.NH_2.R$ in which R is a strong acid having a dissociation constant of at least $1 \times 10^{-2}$. Examples of such acids are hydrochloric, nitric, sulphuric, phosphoric and oxalic acid. Other similar strong acids may be used. For preparing these acid salts various amides containing the monovalent radical $—CO.NH_2$ may be used. Illustrative but non-limiting examples of these amides are as follows:

| | |
|---|---|
| Urea | $NH_2.CO.NH_2$ |
| Biuret | $NH_2.CO.NH.CO.NH_2$ |
| Semi-carbazide | $NH_2NH.CO.NH_2$ |
| Succinamide | $(NH_2COCH_2)_2$ |
| Acetamide | $CH_3CO.NH_2$ |
| Butyramide | $C_3H_7CO.NH_2$ |
| Asparagine | $NH_2.CH\begin{smallmatrix}COOH\\CH_2CO.NH_2\end{smallmatrix}$ |

The acid salts of the amides that we have found advantageous for use in this invention are those made with strong acids such as hydrochloric, nitric, sulphuric, etc., as mentioned above. Illustrative but non-limiting examples of these acid salts are as follows:

| | |
|---|---|
| Urea nitrate | $NH_2.CO.NH_2.HNO_3$ |
| Urea hydrochloride | $NH_2.CO.NH_2.HCl$ |
| Urea phosphate | $(NH_2.CO.NH_2)_3H_3PO_4$ |
| Urea oxalate | $NH_2CO.NH_2.C_2H_2O_4$ |
| Semi-carbazide hydrochloride | $NH_2NH.CO.NH_2.HCl$ |
| Acetamide hydrochloride | $CH_3.CO.NH_2.HCl$ |

The above and similar amide acid salts may be prepared by reacting the amide with the strong acid at normal or elevated temperatures.

These solid acid salts of amides may be blended with the starch in dry form, and in the usual case about 0.5% to 5% by weight of the salts to the weight of the starch will be sufficient to give the necessary thinning action. Where desired, larger amounts of these salts may be used. In accordance with one illustrative but non-limiting example the starch and salt composition may be made into a satisfactory paste for sizing as follows:

A dry blend of common unmodified starch and 5% urea nitrate is mixed with water in the ratio of 1 part of the starch and salt mixture to 17 parts of water and this water suspension heated to a temperature of about 185° F. or higher for about 5 minutes. The resultant starch paste when tested in an arbitrary viscosity test will show a flow of 304 cc. in a certain length of time. In contrast to this the common starch without this salt or any other thinning agent when mixed in the above proportions and heated and tested in the same manner shows a flow of only 21 cc. in the given unit of time. Alternatively if the starch and 5% urea nitrate composition is suspended in water in the proportion of 1 part of the composition to 8 parts of water and the suspension cooked for five minutes, the resulting paste will have a flow of 50 cc. according to the above viscosity test. It is thus apparent that the urea nitrate has a marked effect upon the viscosity of the starch paste solution within a very short time and produces the desired thinning of the starch essential to its use in the textile and paper industries.

As another specific example, if common starch is mixed with 2% of urea nitrate and a paste made using 1 part of this starch composition and 10 parts of water and tested as above it will give a flow of 150 cc.

While some acid may perhaps be liberated from these compounds during the pasting operation it alone would not be a complete explanation of the phenomenal thinning action produced on the starch by these acid salts of amides which we use. These acid salts, which are all solids, may be blended with the starch very easily and the mixture will remain stable, the effect of the salts not taking place until water is added and the suspension heated to form a paste. It is apparent that these salts accomplish a purpose which could not be obtained by use of the strong acids since the latter could not be added to the starch with the formation of a stable and potentially effective mixture before use. We have found it advantageous to use those amide acid salts that are fairly water soluble and likewise to use in preparation of these salts, amides that are also fairly water soluble.

The thinning action on the starch effected by the acid salts of our invention is very rapid upon pasting the starch composition in hot water, particularly during the first few minutes of pasting at a temperature of about 180° F. This thinning action however continues over a period of time to some extent. It may be stopped so as to form a starch paste of any desired consistency either by cooling the paste in which the thinning action is going on, or by adding an alkali to the paste to neutralize it to a pH value of about 7. While we do not wish to limit our invention to any theoretical explanation we believe that the strong acid salts of the amides effect in part the desired thinning of the starch paste by action of the salts on the starch cell outer layers.

While it is not necessary to use special starches to accomplish the purposes of our invention or to preliminarily treat the starch in any manner before the amide acid salt is added, it will be understood that the use of these salts is not restricted to their action on common starch. Any of the modified forms of starches heretofore used may be used in conjunction with our amide acid salts for the purpose of further thinning or modifying these treated starches during the pasting operations.

In view of the fact that the amide acid salts may be mixed with the starch by ordinary mixing operations, for example, in a dry blending machine, the cost of preparing the starch-salt composition for shipment and subsequent use is extremely small. The salts themselves are not expensive and therefore the cost of the starch-salt composition is not materially above the cost of the common starch, all of which is in contrast to the expensive modified starches heretofore used. It will be understood that whenever desired the acid salts may be added to the starch during the pasting operation or at any other desired time instead of being added preliminarily to the starch in dry form.

These amide acid salts are not poisonous bodies and are quite water soluble. Therefore, their use in the paper and textile industries involves no hazards. Furthermore some of these acid salts are hygroscopic in nature and this property may also be used to advantage in certain starch compositions for paper coatings.

The term starch as used in the claims herein is used in a generic sense and therefore includes the common or unmodified starches, and the modified starches defined hereinabove or any desired mixture of such starches.

Various modifications and changes may be made in the materials, compositions and method of procedure described hereinabove without departing from the scope of our invention, some of the novel features of which are defined in the appended claims.

What we claim is:

1. A starch composition comprising starch and a water soluble acid salt of an amide containing the radical $CO.NH_2.R$ in which R is an acid having a dissociation constant of at least about $1 \times 10^{-2}$, said salt being present in sufficient proportion so that when the mixture is heated with water said salt will have a substantial thinning action on the starch.

2. A starch composition comprising starch mixed with approximately 0.5% to 5% of a solid acid salt of an amide containing the radical $CO.NH_2.R$ in which R is a strong acid.

3. A starch composition comprising an admixture of starch and a solid, water soluble acid amide salt selected from the group consisting of the hydrochloric, nitric, sulphuric, phosphoric and oxalic acid salts of urea, biuret, semi-carbazide, succinamide, acetamide, butyramide and asparagine, said salt being present in sufficient proportion to effect substantial thinning action on the starch when the starch and salt mixture is heated with water.

4. A process of producing a starch paste of relatively high starch solids content and relatively low consistency comprising making an aqueous suspension of starch and a solid strong acid salt of an amide and heating said suspension until said amide salt has effected thinning of the starch paste to the desired consistency.

5. A process as defined in claim 4 and further characterized by substantially neutralizing the starch paste with an alkali.

6. A starch composition comprising starch mixed with urea nitrate in such proportions that when the mixture is heated with water said urea nitrate will have a substantial thinning action on said starch.

7. A starch composition comprising starch mixed with urea hydrochloride in such proportions that when the mixture is heated with water said urea hydrochloride will have a substantial thinning action on said starch.

8. A starch composition comprising starch mixed with acetamide hydrochloride in such proportions that when the mixture is heated with water said acetamide hydrochloride will have a substantial thinning action on said starch.

JAMES F. WALSH.
WILLARD L. MORGAN.